(12) United States Patent
Serrano

(10) Patent No.: US 7,797,888 B2
(45) Date of Patent: Sep. 21, 2010

(54) PRE-FABRICATED STORM SHELTER

(76) Inventor: Miguel Serrano, Brahman Dev. Corp., Iberia II Bldg., Suite 904, 552 Austral St., San Juan, PR (US) 00920

( * ) Notice: Subject to any disclaimer, the term of this patent is extended or adjusted under 35 U.S.C. 154(b) by 0 days.

(21) Appl. No.: 12/137,566

(22) Filed: Jun. 12, 2008

(65) Prior Publication Data

US 2009/0307993 A1 Dec. 17, 2009

(51) Int. Cl.
E02D 27/00 (2006.01)
(52) U.S. Cl. ............ 52/169.9; 52/223.2; 52/223.3; 52/223.7; 52/223.9
(58) Field of Classification Search ........... 52/169.9, 52/223.2, 223.3, 223.7, 223.9; 244/30, 120; 114/258, 266, 267, 365
See application file for complete search history.

(56) References Cited

U.S. PATENT DOCUMENTS

| | | | | |
|---|---|---|---|---|
| 288,354 A | * | 11/1883 | Mileham | 52/169.6 |
| 1,577,475 A | * | 3/1926 | Liska | 114/350 |
| 1,953,006 A | * | 3/1934 | Norris | 285/114 |
| 2,394,764 A | * | 2/1946 | Greulich | 114/267 |
| 2,629,348 A | * | 2/1953 | Kifferstein | 109/58 |
| 3,111,811 A | * | 11/1963 | Eggink et al. | 405/135 |
| 3,164,111 A | * | 1/1965 | Lanni | 109/1 S |
| 4,227,477 A | * | 10/1980 | Preus | 114/256 |
| 4,702,192 A | * | 10/1987 | Butka | 114/122 |
| 4,805,360 A | * | 2/1989 | Kuehnl | 52/169.1 |
| 4,835,919 A | * | 6/1989 | Side | 52/79.9 |
| 5,115,613 A | * | 5/1992 | McCarthy | 52/169.6 |
| 5,544,460 A | * | 8/1996 | Fife | 52/223.3 |
| 5,749,181 A | * | 5/1998 | Bauman | 52/169.6 |
| 6,161,345 A | * | 12/2000 | Hope et al. | 52/169.6 |
| 6,385,920 B1 | * | 5/2002 | Chandler | 52/169.6 |
| 2005/0276862 A1 | * | 12/2005 | Bringley et al. | 424/490 |

* cited by examiner

Primary Examiner—Brian E Glessner
Assistant Examiner—James J Buckle, Jr.
(74) Attorney, Agent, or Firm—Luis Figarella

(57) ABSTRACT

A prefabricated storm shelters that can be easily repositioned and assembled while providing safe, secure shelter before, during and after a catastrophic event are described, as well as a method to mfr. them.

1 Claim, 3 Drawing Sheets

PRE-FABRICATED STORM SHELTER

FIELD OF THE INVENTION

This invention relates to pre-fabricated storm shelters that can be easily repositioned and assembled while providing safe, secure shelter before, during and after a catastrophic events, as well as a method to mfr. them.

BACKGROUND

Recent events have demonstrated the need for emergency temporary shelter for humans, their pets and supplies prior to, during and shortly after natural emergencies. Disasters such as hurricanes, tornadoes and floods have shown time after time the need for sturdy shelters capable of surviving cataclysms. Previous efforts have concentrated primarily in underground shelters (designed to survive Tornadoes and or WWII-era bombings), or on shelters that must be in place before a structure is built. Such structures are proposed by Drager, U.S. Pat. No. 2,903,874, Qauline et al, U.S. Pat. No. 4,955,166 and Spene, U.S. Pat. Nos. 6,260,312 and 6,263,637 (All incorporated here by reference).

While preparedness is superb, time and again we have learned that human nature tends to prepare for situations only as a last resort. In addition, circumstances have demonstrated the need for supplies shortly after an emergency, while the logistics difficulties (and need) of bringing support and help to those in need is the highest.

A need therefore exists for a cost-effective shelter that can be easily transported and erected on-site by low skilled workers (possibly days or hours before the event), in such a way to resists threats such as Tornadoes, Hurricanes, Tsunamis, Hail storms, Avalanches, Pole Shift and other events.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention provides for a sealed compartment that is created by joining together pre-cast modules, creating a sealed environment by closing both ends with end caps. In this way, a sealed tubular structure of indeterminate length can be created, capable of holding humans and their pets, equipment and/or supplies for a period of time. Since the cross-section of the modules all match, a single-body sealed vessel is created by their union.

The modular characteristics of the system allows for the easy transport over roadways, railways, aircraft or barges of the assembly sub-modules. A unit may be made up of any collection of middle modules, capped at both ends by the end modules. In this way, emergency shelters, hospitals, supply depots and other structures may be pre-positioned near expected locations of need.

The unit may be located completely underground, partially underground within a ditch, surface mounted on bases, or protected by an exposed berm in order to protect it and its occupants from flying debris. If unforeseen circumstances cause the unit to be under water, the unit's natural buoyancy will cause it to float. For this reason, each module may be configured with a functional keel and ballast (be it external or internal).

Other features and advantages of the present invention will become apparent upon examining the following detailed description of an embodiment thereof, taken in conjunction with the attached drawings.

DETAILED DESCRIPTION

Figure 1:
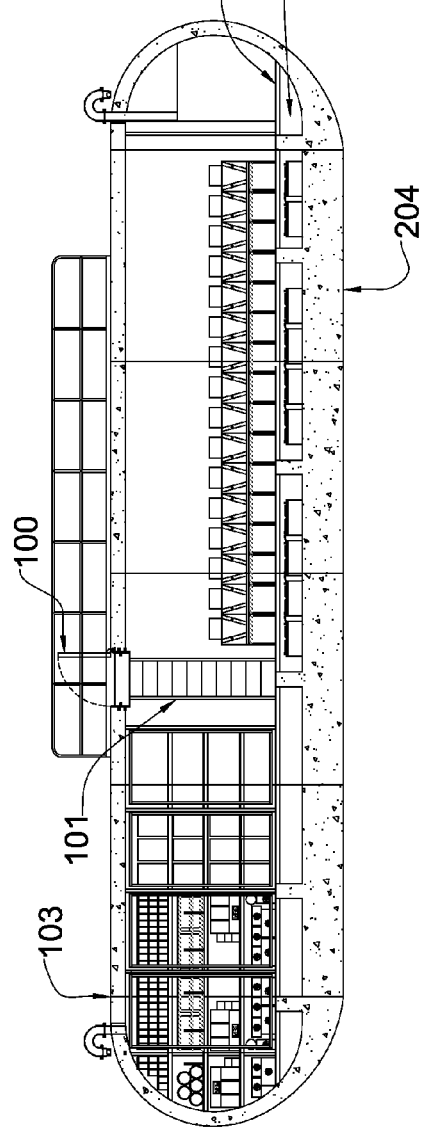
FIG. 1 shows a longitudinal section view of the unit when completely assembled.

FIG. 1 illustrates a side view of a completely assembled structure. The human figures are provided as an approximate scale comparison, not for exact measurements. In one embodiment, the entry through the top 100 is equipped with means of opening and closure that are water proof and can be secured from the inside. These may be designed to be opened either outwards, inwards or both, so that occupants can open it, even when felled objects or other structures are laying on it after a storm. Optional tools may be provided inside the shelter for alternate means of exit in an emergency. These may include power tools capable of cutting through the walls or openings.

A ladder 101 allows for occupants to descend into the shelter floor 102 and later exit. While the shelter may be built of varying dimensions and materials, it is recommended that its walls be built with enough strength to survive expected stresses, while providing humans with a reasonable environment in which to survive a stressful time. In one embodiment, this may be at least 5 centimeters of wall thickness when using cement. Embodiments using composite materials may be thinner than 2 cm.

In looking for appropriate dimensions, we have focused on the ergonomic dimensions of similar tubular vessels, such as small business jets. For this reason, in the preferred embodiment, the internal diameter is envisioned to be at least 3.0 meters, although circumstances may alter these as required.

Thus, in some situations (e.g. when the vessel is being constructed only for storage), smaller or larger dimensions may be desired. Note that in addition to the standing height, care must be taken to ensure that the external diameter of the modules does not exceed the local limitations on height when loaded in the bed of a truck, airplane or train for transport.

Figure 2:
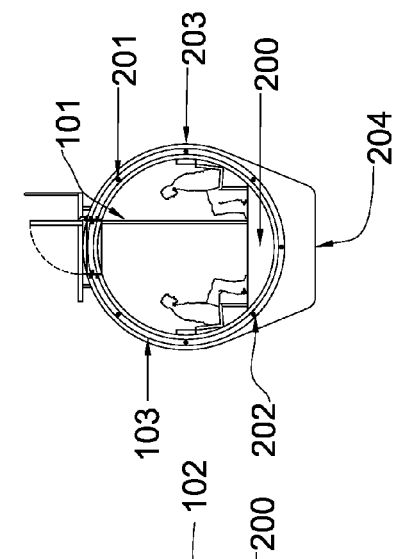
FIG. 2 shows a Transversal view of a module.

FIG. 2 illustrates the transversal view (or cross section) of a module. Note that the occupants stand on the floor, which in the preferred embodiment is placed above a bilge compartment 200. This bilge compartment minimizes occupant contact with any fluids that may occur from small leaks in the vessel. This space may be equipped with a pump, and doubles (if necessary) as a location for human physiological by-products (both liquid and solid).

When built out of concrete, the modules are linked together via 2.54 mm steel cables that run across conduits in every module from end to end 201, and are post tensed. These cables are located along the entire periphery of the structure 202, 203 and others). This is a well-understood compression situation for concrete structures that provides the assembled vessel structural integrity. Dynamic pressure seals 103 are used between the modules, to provide an air and water tight seal. In other embodiments, the modules may be built of other materials, such as carbon-fiber reinforced walls, and connected to each other via fasteners.

This modular construction is a key feature of the invention, for it allows for easy transportation of the modules to the area under threat. In addition, it allows for the customization of modules during mfr. It thus becomes possible to equip a series of modules with all the equipment found in a surgical suite. In this case an entry capable of admitting a patient in a litter may be provided, or means (e.g. explosive or cutting tools) provided so as to remove one end of the module once the storm has subsided.

Figure 3:
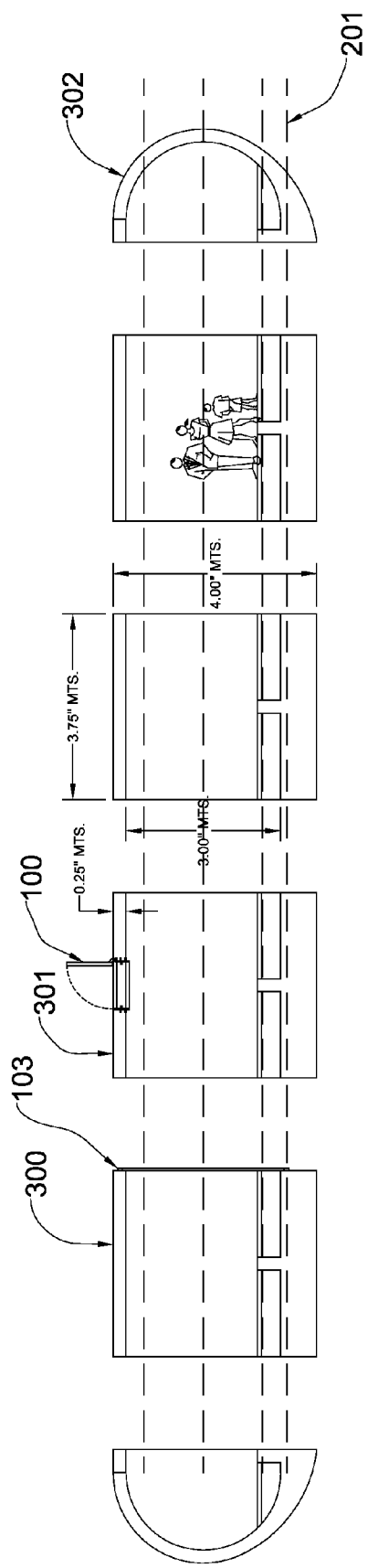
FIG. 3 shows a longitudinal section view with details of the modules before their attachment.

FIG. 3 provides an expanded view of an example unit built out of three basic system modules. As noted, these modules are an example configuration, with many other variations on their basic and simple design possible. These example embodiment dimensions are for a concrete shelter. In this case, six total modules are assembled into a unit. The main body module 300 is shown. It is of a cylindrical shape, 3.65 m long, 4 m high (including the optional keel), with an internal diameter of 3 m, and walls that are 0.25 m deep. To provide for easy entry, exit, and minimize costs, one of these body modules 301 has been alternatively modified to include an entry/exit 100 and ladder/stairs 101. The end units 302 create an enclosed space.

Figure 4:
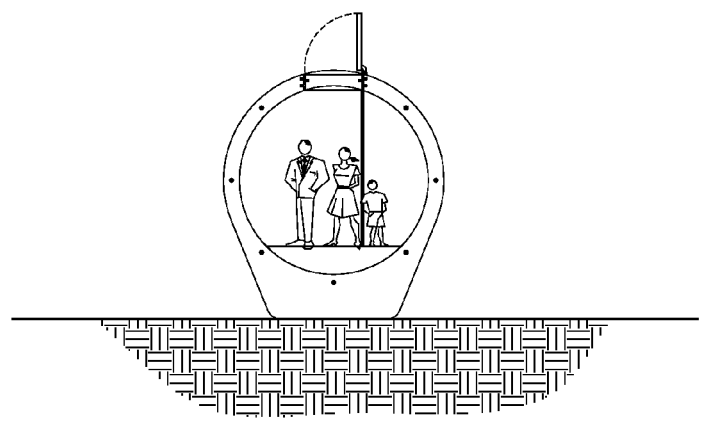
FIGS. 4, 5 and 6 illustrate embodiments of the unit above ground, within the ground and below ground respectively.
Figure 5:
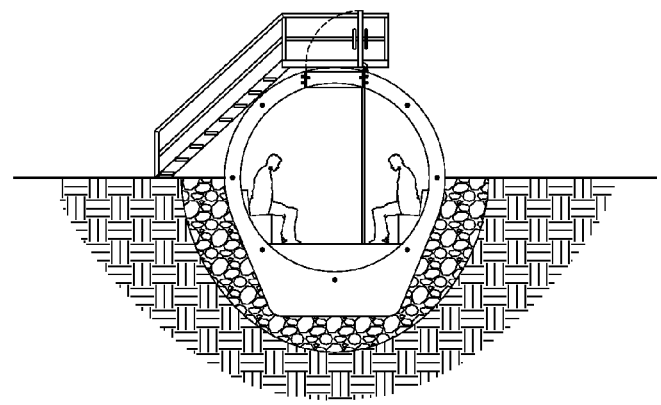
Figure 6:
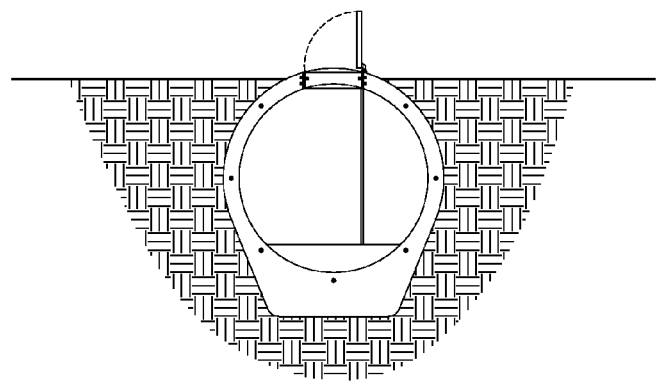

While in some applications the unit may be covered with earth (or more concrete) and completely placed underground, this is not considered a necessity. FIGS. 4, 5 and 6 illustrate example embodiments of the unit above ground, within the ground and below ground respectively As previously mentioned, protection from flying objects may be accomplished by placing the unit within raised berms (whether these berms are constructed of earth or man-made materials), accomplishing a similar function. In addition, the unit itself may be placed within other buildings (such as an airplane hangar), or among rows of other buildings.

In any case, the unit location may be flooded, and for this reason the unit has been configured as a floating vessel. Among other things, its design obeys water buoyancy laws, that is, the internal volume is larger than its gross weight, regardless of the material it is built with. This will guarantee its flotation.

In addition, when the unit is mfd. from a heavy material (such as concrete), its bottom is shaped with a keel 204 assembly of additional material sufficient to perform the self-righting function. In cases where lighter materials are used (such as carbon reinforced fibers), additional weight placed at the bottom (provided by metal or concrete members) may perform this function.

The structure described above provides for a minimalist survival experience. If a long stay is expected (as is the case with most hurricanes), either the door, or the structure body may be equipped with a ventilation means, either through natural convection or via forced air movement means. In addition, Heating/Ventilation Air Conditioning (HVAC) or air recycling or scrubbing means may be supplied, together with a power source for it.

In addition, if flooding is expected, the unit may be equipped with a snorkel-type ventilation input (air box), to prevent water from entering the unit during temporary wave immersion. Optionally, means may be provided for the occupants to close the ventilation openings manually during short periods, allowing for the air inside the structure to act as a closed loop device. In these cases, providing the occupants with air quality measurement devices may be suggested.

Illumination may be provided by Light Emitting Diodes LED solid-state lighting, providing for long-lasting energy and no heat generation.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. An apparatus comprising: a horizontally extending housing comprised of connected tubular concrete modules that define a space each having a floor portion, side wall portions, a sub-floor bilge compartment and a ceiling portion, with entry and exit means in at least one said module; end unit modules that enclose said space; tensed cables running longitudinally across all said modules in order to secure the modules to each other by means of longitudinal compression; a flexible seal between said modules that provide for an air and water tight seal; said modules having a specific mass as to provide the complete assembly with positive buoyancy characteristics when immersed in water: and a keel assembly that provides self-righting capabilities.

* * * * *